US008545667B2

(12) United States Patent
Lammerschop et al.

(10) Patent No.: US 8,545,667 B2
(45) Date of Patent: Oct. 1, 2013

(54) PUMPABLE EPOXY PASTE ADHESIVES RESISTANT TO WASH-OFF

(75) Inventors: Olaf Lammerschop, Danville, CA (US); Scott Hartsell, Troy, MI (US); Rajat K. Agarwal, Brighton, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 7 days.

(21) Appl. No.: 12/793,786

(22) Filed: Jun. 4, 2010

(65) Prior Publication Data
US 2011/0036497 A1 Feb. 17, 2011

Related U.S. Application Data

(63) Continuation of application No. PCT/US2007/021283, filed on Oct. 3, 2007.

(60) Provisional application No. 60/850,133, filed on Oct. 6, 2006.

(51) Int. Cl.
C09J 163/02 (2006.01)
C09J 119/00 (2006.01)
C08K 3/34 (2006.01)
C08G 59/24 (2006.01)

(52) U.S. Cl.
USPC ........... 156/330; 523/427; 523/428; 523/440; 523/466; 525/523; 525/524; 977/783

(58) Field of Classification Search
None
See application file for complete search history.

(56) References Cited

U.S. PATENT DOCUMENTS

| | | |
|---|---|---|
| 2,739,075 A | 3/1956 | Her |
| 2,786,042 A | 3/1957 | Her |
| 2,831,820 A | 4/1958 | Aase et al. |
| 2,966,506 A | 12/1960 | Jordan |
| 3,297,745 A | 1/1967 | Fekete et al. |
| 3,320,187 A | 5/1967 | Burt |
| 3,406,131 A | 10/1968 | Kuehlkamp et al. |
| 3,425,964 A | 2/1969 | Stanley |
| 3,525,779 A | 8/1970 | Hawkins |
| 3,636,133 A | 1/1972 | Hawkins |
| 3,985,703 A | 10/1976 | Ferry et al. |
| 4,116,866 A | 9/1978 | Finlayson |
| 4,180,529 A | 12/1979 | Hofmann |
| 4,315,085 A | 2/1982 | Ozari et al. |
| 4,340,716 A | 7/1982 | Hata et al. |
| 4,360,653 A | 11/1982 | Stevens et al. |
| 4,382,868 A | 5/1983 | House |
| 4,390,662 A | 6/1983 | Ando et al. |
| 4,412,018 A | 10/1983 | Finlayson et al. |
| 4,419,496 A | 12/1983 | Henton et al. |
| 4,434,076 A | 2/1984 | Mardis et al. |
| 4,474,705 A | 10/1984 | Clay et al. |
| 4,474,706 A | 10/1984 | Clay et al. |
| 4,486,582 A | 12/1984 | Hefner, Jr. |
| 4,517,112 A | 5/1985 | Mardis et al. |
| 4,569,923 A | 2/1986 | Knudson, Jr. et al. |
| 4,618,658 A | 10/1986 | Hefner, Jr. et al. |
| 4,621,025 A | 11/1986 | Smith |
| 4,664,842 A | 5/1987 | Knudson, Jr. et al. |
| 4,695,402 A | 9/1987 | Finlayson et al. |
| 4,702,962 A | 10/1987 | Kojo et al. |
| 4,719,268 A | 1/1988 | Hefner, Jr. et al. |
| 4,742,098 A | 5/1988 | Finlayson et al. |
| 4,778,851 A | 10/1988 | Henton et al. |
| 4,894,182 A | 1/1990 | Cody et al. |
| 5,006,611 A | 4/1991 | Schmid et al. |
| 5,030,698 A | 7/1991 | Muelhaupt et al. |
| 5,073,601 A | 12/1991 | Muelhaupt et al. |
| 5,075,033 A | 12/1991 | Cody et al. |
| 5,084,532 A | 1/1992 | Schenkel |
| 5,110,501 A | 5/1992 | Knudson, Jr. et al. |
| 5,160,454 A | 11/1992 | Knudson, Jr. et al. |
| 5,198,524 A | 3/1993 | Bush et al. |
| 5,202,390 A | 4/1993 | Muelhaupt et al. |
| 5,218,063 A | 6/1993 | Kimball |
| 5,223,586 A | 6/1993 | Mautner et al. |
| 5,232,996 A | 8/1993 | Shah et al. |
| 5,278,257 A | 1/1994 | Muelhaupt et al. |
| 5,290,857 A | 3/1994 | Ashida et al. |
| 5,334,654 A | 8/1994 | Starner et al. |
| 5,336,647 A | 8/1994 | Nae et al. |
| 5,382,635 A | 1/1995 | McInnis et al. |
| 5,429,999 A | 7/1995 | Nae et al. |

(Continued)

FOREIGN PATENT DOCUMENTS

| | | |
|---|---|---|
| CA | 1330143 C | 6/1994 |
| CA | 1334700 C | 3/1995 |

(Continued)

OTHER PUBLICATIONS

Kishi, H. et al. "Shear ductility and toughenability study of highly cross-linked epoxy/polyethersulphone" Journal of Materials Science, Chapman & Hall, vol. 32, No. 3, Feb. 1997, pp. 761-771.

(Continued)

Primary Examiner — Michael J Feely
(74) Attorney, Agent, or Firm — Steven C. Bauman

(57) ABSTRACT

This invention relates to compositions useful as adhesives and more particularly to the preparation of heat-curable epoxy-based adhesive compositions that are capable of being easily pumped under high shear at temperatures around room temperature but are resistant to being washed off substrate surfaces prior to being cured.

13 Claims, No Drawings

(56) References Cited

U.S. PATENT DOCUMENTS

| | | |
|---|---|---|
| 5,506,283 A | 4/1996 | McInnis et al. |
| 5,534,594 A | 7/1996 | Troy et al. |
| 5,547,713 A | 8/1996 | Alvarado |
| 5,637,179 A | 6/1997 | Nakayama et al. |
| 5,663,111 A | 9/1997 | Gadberry et al. |
| 5,677,387 A | 10/1997 | Bayard et al. |
| 5,686,509 A | 11/1997 | Nakayama et al. |
| 5,686,534 A | 11/1997 | Bayard et al. |
| 5,693,714 A | 12/1997 | Bauman et al. |
| 5,700,891 A | 12/1997 | Huver et al. |
| 5,728,764 A | 3/1998 | Bauer et al. |
| 5,739,087 A | 4/1998 | Dennis |
| 5,755,468 A | 5/1998 | Buchanan, Jr. |
| 5,755,486 A | 5/1998 | Wycech |
| 5,789,482 A | 8/1998 | Eldin et al. |
| 5,863,970 A | 1/1999 | Ghoshal et al. |
| 5,886,112 A | 3/1999 | Vuillemin et al. |
| 5,891,367 A | 4/1999 | Basheer et al. |
| 5,891,697 A | 4/1999 | Croteau et al. |
| 5,969,053 A | 10/1999 | Bauman et al. |
| 5,981,659 A | 11/1999 | Geck et al. |
| 6,015,865 A | 1/2000 | Blank et al. |
| 6,036,765 A | 3/2000 | Farrow et al. |
| 6,037,392 A | 3/2000 | Tang et al. |
| 6,045,898 A * | 4/2000 | Kishi et al. ............... 428/292.1 |
| 6,063,839 A | 5/2000 | Oosedo et al. |
| 6,070,427 A | 6/2000 | Fine et al. |
| 6,111,015 A | 8/2000 | Eldin et al. |
| 6,147,142 A | 11/2000 | Geck et al. |
| 6,180,693 B1 | 1/2001 | Tang et al. |
| 6,238,653 B1 | 5/2001 | Narasimhan et al. |
| 6,270,600 B1 | 8/2001 | Wycech |
| 6,316,528 B1 | 11/2001 | Iida et al. |
| 6,323,263 B1 | 11/2001 | Kuwabawa et al. |
| 6,331,580 B1 | 12/2001 | Molnar |
| 6,332,731 B1 | 12/2001 | Wycech |
| 6,348,513 B1 | 2/2002 | Hilborn et al. |
| 6,372,350 B1 | 4/2002 | Scott et al. |
| 6,534,570 B2 | 3/2003 | Farrow et al. |
| 6,555,187 B1 | 4/2003 | Kitamura |
| 6,573,309 B1 | 6/2003 | Reitenbach et al. |
| 6,635,108 B1 | 10/2003 | Farrow et al. |
| 6,652,774 B2 | 11/2003 | Zhou et al. |
| 6,776,869 B1 | 8/2004 | Schenkel |
| 6,787,592 B1 | 9/2004 | Powell et al. |
| 6,884,854 B2 | 4/2005 | Schoenfeld et al. |
| 6,894,113 B2 | 5/2005 | Court et al. |
| 6,998,011 B2 | 2/2006 | Schoenfeld et al. |
| 7,125,461 B2 | 10/2006 | Czaplicki et al. |
| 2001/0009952 A1 | 7/2001 | Tan et al. |
| 2002/0089071 A1 | 7/2002 | Sumita et al. |
| 2002/0106515 A1 | 8/2002 | Carpenter et al. |
| 2003/0051807 A1 | 3/2003 | Yamaguchi et al. |
| 2003/0125423 A1 | 7/2003 | George et al. |
| 2003/0187154 A1 | 10/2003 | Schoenfeld et al. |
| 2003/0196753 A1 | 10/2003 | Schoenfeld et al. |
| 2003/0211953 A1 | 11/2003 | Glenn et al. |
| 2004/0039084 A1 | 2/2004 | Beisele |
| 2004/0058181 A1 | 3/2004 | Garnault et al. |
| 2004/0181013 A1 | 9/2004 | Schenkel |
| 2004/0266899 A1 | 12/2004 | Muenz et al. |
| 2005/0000619 A1 | 1/2005 | Schenkel et al. |
| 2005/0016677 A1* | 1/2005 | Carlson et al. ............... 156/330 |
| 2005/0022929 A1 | 2/2005 | Schoenfeld et al. |
| 2005/0070634 A1 | 3/2005 | Lutz et al. |
| 2005/0124761 A1 | 6/2005 | Schultes et al. |
| 2005/0129955 A1 | 6/2005 | Schoenfeld et al. |
| 2005/0159511 A1 | 7/2005 | Kramer |
| 2005/0209401 A1 | 9/2005 | Lutz et al. |
| 2005/0215730 A1 | 9/2005 | Schoenfeld |
| 2005/0249891 A1 | 11/2005 | Kitamura et al. |
| 2005/0282990 A1 | 12/2005 | Schoenfeld et al. |
| 2006/0022790 A1 | 2/2006 | Mori et al. |
| 2006/0030682 A1 | 2/2006 | Hurley et al. |
| 2006/0228545 A1 | 10/2006 | Husemann et al. |
| 2006/0276601 A1 | 12/2006 | Lutz et al. |
| 2007/0027233 A1 | 2/2007 | Yamaguchi et al. |
| 2007/0034432 A1 | 2/2007 | Rosenberg et al. |
| 2007/0036971 A1 | 2/2007 | Inada et al. |
| 2007/0066721 A1 | 3/2007 | Kramer et al. |
| 2007/0104958 A1 | 5/2007 | Golden |
| 2007/0105983 A1 | 5/2007 | Kramer et al. |
| 2007/0116961 A1 | 5/2007 | Connell et al. |
| 2007/0251419 A1 | 11/2007 | Yamaguchi et al. |
| 2008/0029200 A1 | 2/2008 | Sheasley |
| 2008/0051524 A1 | 2/2008 | Ji et al. |
| 2008/0063816 A1* | 3/2008 | Imalzumi et al. ............ 428/1.52 |
| 2008/0071002 A1 | 3/2008 | Jethmalani et al. |
| 2008/0172807 A1 | 7/2008 | Brun |
| 2008/0188609 A1 | 8/2008 | Agarwal et al. |
| 2009/0294057 A1 | 12/2009 | Liang et al. |
| 2010/0130655 A1 | 5/2010 | Agarwal et al. |
| 2011/0206890 A1 | 8/2011 | Belpaire et al. |

FOREIGN PATENT DOCUMENTS

| | | |
|---|---|---|
| CA | 2346634 A1 | 4/2000 |
| CA | 2510486 A1 | 7/2004 |
| CA | 2518618 A1 | 9/2004 |
| CA | 2532215 A1 | 1/2005 |
| CA | 2557352 A1 | 9/2005 |
| EP | 0342035 A2 | 11/1989 |
| EP | 0836892 A2 | 4/1998 |
| EP | 0971011 A1 | 1/2000 |
| EP | 1506975 A1 | 2/2005 |
| EP | 1602702 A1 | 12/2005 |
| FR | 2910309 A1 | 6/2008 |
| JP | 58063758 A | 4/1983 |
| JP | 58069265 A | 4/1983 |
| JP | 61252224 A | 11/1986 |
| JP | 63081121 A | 4/1988 |
| JP | 04332785 A | 11/1992 |
| JP | 5111973 A | 5/1993 |
| JP | 06287411 A | 10/1994 |
| JP | 09025393 A | 1/1997 |
| JP | 9040831 A | 2/1997 |
| JP | 09095599 A | 4/1997 |
| JP | 11172076 A | 6/1999 |
| JP | 11221875 A | 8/1999 |
| JP | 2000017246 A | 1/2000 |
| JP | 2000141538 A | 5/2000 |
| JP | 2000347203 A | 12/2000 |
| JP | 2001019929 A | 1/2001 |
| JP | 2002284849 A | 10/2002 |
| JP | 2003020379 A | 1/2003 |
| JP | 2003277579 A | 10/2003 |
| JP | 2003286391 A | 10/2003 |
| JP | 2005248134 A | 9/2005 |
| JP | 2005255822 A | 9/2005 |
| KR | 1020040049913 A | 6/2004 |
| KR | 100524830 B1 | 10/2005 |
| WO | 9617880 A1 | 6/1996 |
| WO | 0052088 A1 | 9/2000 |
| WO | 2005062369 A1 | 7/2005 |
| WO | WO 2005091064 A1 * | 9/2005 |
| WO | 2005108487 A1 | 11/2005 |
| WO | 2006107273 A1 | 10/2006 |

OTHER PUBLICATIONS

Ebenhoch, Jochen. "Tough and Heat-resistant: New Silicone Particles for Thermosets," Kunststoffe plast eroupe, Dec. 2004.

Product Data Sheet for NACURE Super XC-7231 Catalyst, provided by King Industries (no date).

Definition of "Ammonium Antimonate", (p. 285); Watts' Dictionary of Chemistry, (1890), pp. 282-294.

International Search Report and Written Opinion, dated Mar. 30, 2007, International Application PCT/US2006/041484.

"The Next Kaneka" publication date unknown; Retrieved from www.Kaneka.com on Feb. 11, 2008.

Manluo, He. "Epoxy Resin Adhesive" Petrochemical Press, Apr. 30, 2004, pp. 116-117, 292.

* cited by examiner

PUMPABLE EPOXY PASTE ADHESIVES RESISTANT TO WASH-OFF

CROSS-REFERENCE TO RELATED CASES

This application is a continuation under 35 U.S.C. Sections 365(c) and 120 of International Application No. PCT/US2007/021283, filed Oct. 3, 2007 and published on Apr. 17, 2008 as WO 20081045270, which claims priority from U.S. Provisional Patent Application Ser. No. 60/850,133 filed Oct. 6, 2006, which are incorporated herein by reference in their entirety.

BACKGROUND OF THE INVENTION

1. Field of the Invention

This invention relates to compositions useful as adhesives and more particularly to the preparation of epoxy-based adhesive compositions having a desirable combination of rheological properties.

2. Brief Discussion of the Related Art

Epoxy resins have traditionally been extensively used as components of adhesives, especially structural adhesives, in view of their desirable combination of properties. Epoxy resin-based adhesives commonly exhibit excellent strength, toughness, corrosion, moisture and solvent resistance, high load-bearing properties, good adhesion and electrical properties, good dimensional stability, hardness and low shrinkage upon curing. Typically, epoxy resins may be formulated as one-component adhesives, together with other components such as fillers, tougheners, curatives and the like, which are applied in paste form between two substrate surfaces and then heated to effect curing (crosslinking) of the epoxy resin.

Good rheological control is important for such epoxy paste adhesives, as it will be desirable for the adhesive to thin under shear to allow for easy handling and application to a substrate surface. However, once it has been applied, the bead, ribbon or layer of adhesive must not slump or sag to an appreciable extent or be easily moved on or separated from the substrate surface by externally applied forces such as gravity or the impingement of liquids such may be encountered when the substrate surface bearing the adhesive is exposing to a washing or dipping operation (as typically occurs, for example, during assembly of a vehicle). Such movement or separation of the applied adhesive creates a number of problems, including degraded adhesive bond quality and contamination of the aqueous liquid (e.g., phosphating bath) with the adhesive. While a number of different types of rheological control agents have been proposed for use in epoxy paste adhesives in order to control their viscosity and yield value properties, further improvements in such systems are still highly desired by the end-users of these adhesives.

SUMMARY OF THE INVENTION

The present invention provides a pumpable and wash-off resistant epoxy paste adhesive comprising at least one epoxy resin, rubber particles having a core-shell structure and an average particle size of not more than 200 nm, at least one nanoclay thixotropic agent (in particular, a mixed mineral thixotrope), and at least one heat-activated latent curing agent. Using both nanosized core-shell rubber particles and a nanoclay thixotropic agent in combination with each other has unexpectedly been found to provide an epoxy paste adhesive that under high shear thins to a sufficiently low viscosity that it can be readily delivered by pumping to the desired location where the adhesive is to be applied, without having to heat the adhesive to a relatively high temperature (which may require special heating and handling equipment, which will result in higher energy consumption, and which creates a greater risk of triggering premature curing of the adhesive by activation of the latent curing agent). At the same time, however, the epoxy paste adhesive exhibits a relatively high yield value, even at moderately elevated temperatures, making it unusually resistant to wash-off.

DETAILED DESCRIPTION OF CERTAIN EMBODIMENTS OF THE INVENTION

Epoxy Resins

In general, a large number of polyepoxides having at least about two 1,2-epoxy groups per molecule are suitable as epoxy resins for the compositions of this invention. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)-methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolak resin-type.

Other epoxy resins that are in principle suitable are the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Other suitable epoxy resins include polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other useful epoxy resins are derived from the epoxidation products of olefinically-unsaturated cycloaliphatic compounds or from natural oils and fats.

Particular preference is given to the liquid epoxy resins derived by reaction of bisphenol A or bisphenol F and epichlorohydrin. The epoxy resins that are liquid at room temperature generally have epoxy equivalent weights of from 150 to about 480.

The epoxy resins that are solid at room temperature may also or alternatively be used and are likewise obtainable from polyphenols and epichlorohydrin. Other polyepoxides that are in principle suitable are the polyglycidyl ethers of non-phenolic polyalcohols or diamines. Such polyglycidyl ethers may be derived from aliphatic polyalcohols, such as ethylene glycol, diethylene glycol, triethylene glycol, 1,2-propylene glycol, 1,4-butylene glycol, triethylene glycol, 1,5-pentanediol, 1,6-hexanediol, cyclohexane dimethanol or trimethylolpropane.

Particular preference is given to the liquid epoxy resins derived by reaction of bisphenol A or bisphenol F and epichlorohydrin. The epoxy resins that are liquid at room temperature generally have preference is given to those based on bisphenol A or bisphenol F having a melting point of from 45 to 130° C., preferably from 50 to 80° C. They differ from the liquid epoxy resins substantially by the higher molecular weight thereof, as a result of which they become solid at room temperature. The solid epoxy resins generally have an epoxy equivalent weight of ≥400.

Typically, the composition may contain from about 30 to about 65 weight percent (in one embodiment, from about 35 to about 60 weight percent) of epoxy resin (unless otherwise stated, all concentrations set forth herein are expressed in terms of the weight percent of the component in question based on the adhesive composition as a whole). In one desirable embodiment of the invention, the adhesive composition contains both at least one polyglycidyl ether of a polyphenol (e.g., diglycidyl ethers of bisphenol A, especially such epoxy resins that are liquid at 25° C.) and at least one polyglycidyl ether of an aliphatic polyalcohol (e.g., the diglycidyl ether of cyclohexane dimethanol). Such epoxy resins may be utilized in a weight ratio, for example, of from about 2:1 to about 8:1 (polyglycidylether of polyphenol:polyglycidyl ether of aliphatic polyalcohol).

Nanosized Core-Shell Rubber Particles

Rubber particles having a core-shell structure and a relatively small average particle size (<200 nm) are an additional component of the compositions of the present invention. Such particles (sometimes referred to herein as "nanosized core-shell rubber particles") generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other rubbery polymers may also be suitably be used for the core, including polybutylacrylate or polysiloxane elastomer (e.g., polydimethylsiloxane, particularly crosslinked polydimethylsiloxane). The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently), as described, for example, in U.S. Pat. No. 5,686,509 (incorporated herein by reference in its entirety). The shell may be grafted onto the core. The polymer comprising the shell may bear one or more different types of functional groups (e.g., epoxy groups) that are capable of interacting with other components of the compositions of the present invention.

Typically, the core will comprise from about 50 to about 95 percent by weight of the rubber particles while the shell will comprise from about 5 to about 50 percent by weight of the rubber particles.

For the epoxy paste adhesive to possess the desired rheological characteristics, it is critical that the rubber particles be relatively small in size. For example, the average particle size should be less than about 200 nm. For example, the core-shell rubber particles may have an average diameter within the range of from about 25 to about 200 nm or from about 50 to about 150 nm. Average particle size may be measured using photon correlation spectroscopy (sometimes referred to as dynamic light scattering or quasielectric light scattering).

Methods of preparing rubber particles having a core-shell structure are well-known in the art and are described, for example, in U.S. Pat. Nos. 3,985,703, 4,180,529, 4,315,085, 4,419,496, 4,778,851, 5,223,586, 5,290,857, 5,534,594, 5,686,509, 5,789,482, 5,981,659, 6,111,015, 6,147,142, 6,180,693, and 6,331,580 and published U.S. application 2005-124761, each of which is incorporated herein by reference in its entirety.

In one especially desirable embodiment of the invention, the nanosized rubber particles having a core-shell structure are prepared and supplied to the epoxy paste adhesive as a masterbatch where the rubber particles are dispersed in one or more epoxy resins such as a liquid (at room temperature) diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in United States Published Application 2007-027233, incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch. Other methods for preparing masterbatches of rubber particles having a core-shell structure stably dispersed in an epoxy resin matrix are described in U.S. Pat. Nos. 4,778,851 and 6,111,015, each incorporated herein by reference in its entirety. Preferably, the rubber particles are stably dispersed in the epoxy resin matrix; i.e., the core-shell rubber particles remain as separated individual particles with little or no agglomeration of the particles or precipitation (settling) of the particles from the masterbatch as the masterbatch is aged by standing at room temperature. The shell of the rubber particles may advantageously be functionalized to improve the stability of the masterbatch, although in another embodiment the shell is non-functionalized (i.e., does not contain any functional groups that react with any of the other components of the adhesive composition when that composition is cured).

The core may be formed predominantly from feed stocks of dienes such as butadiene, (meth)acrylates, ethylenically unsaturated nitriles such as acrylonitrile, and/or any other monomers that when polymerized or copolymerized yield a polymer or copolymer having a low glass transition temperature. The outer shells may be formed predominantly from feed stocks of (meth)acrylates such as methylmethacrylate, vinyl aromatic monomers such as styrene and/or ethylenically unsaturated halocarbons such as vinyl chloride and/or any other monomers that when polymerized or copolymerized yield a polymer having a higher glass transition temperature.

The core shell rubber made in this way may be dispersed in an epoxy matrix or a phenolic matrix. Examples of epoxy matrices include the diglycidyl ethers of bisphenol A, F or S, or bisphenol, novalac epoxies, and cycloaliphatic epoxies. Examples of phenolic resins include bisphenol-A based phenoxies.

The polymer constituting the rubber particle core preferably is an elastic material comprised of (in polymerized form) not less than 50% by weight of at least one monomer selected from the group consisting of a diene monomer (conjugated diene monomer) and a (meth)acrylate monomer and less than 50% by weight of another copolymerizable vinyl monomer. In the present invention, (meth)acrylate means acrylate and/or methacrylate.

Suitable conjugated diene monomers include, for example, butadiene, isoprene, chloroprene, and the like, among which butadiene is particularly preferable. The (meth)acrylate monomers may include, for example, butyl acrylate, 2-ethylhexyl acrylate, lauryl methacrylate, and the like, among which butyl acrylate and 2-ethylhexyl acrylate are particularly preferable. These can be used alone or as a mixture of two or more thereof.

The total amount of conjugated diene monomer and/or (meth)acrylate monomer is preferably not less than 50% by weight, more preferably not less than 60% by weight, based on the total weight of the monomers used to make the core polymer.

The core polymer may be comprised not only of conjugated diene monomer(s) and/or (meth)acrylate monomers but also one or more vinyl monomers copolymerizable therewith. The vinyl monomers copolymerizable with the conjugated diene monomer or (meth)acrylate monomer include, but are not limited to, monomers selected from the group consisting of aromatic vinyl monomers and vinyl cyanide monomers. Suitable aromatic vinyl monomers include, for example, styrene, α-methylstyrene and vinyl naphthalene, and suitable vinyl cyanide monomers include, for example, acrylonitrile, methacrylonitrile and other substituted acrylonitriles. These can be used alone or in combination thereof.

The amount of these copolymerizable vinyl monomers used is preferably less than 50% by weight, more preferably less than 40% by weight, based on the total weight of the monomers used to prepare the core polymer.

To adjust the degree of crosslinking, a multifunctional monomer may be contained as a component in the synthesis of the core copolymer. Examples of multifunctional monomers include compounds containing two or more carbon-carbon double bonds such as divinyl benzene, butane diol di(meth)acrylate, triallyl(iso)cyanurate, allyl(meth)acrylate, diallyl itaconate, diallyl phthalate, and the like. The amount of the multifunctional monomer used is typically not higher than 10% by weight, preferably not higher than 5% by weight, more preferably not higher than 3% by weight, based on the total weight of the monomers used to prepare the core polymer.

To adjust the molecular weight of the core polymer or the extent to which the core polymer is crosslinked, a chain transfer agent may be used. For example, C5 to C20 alkyl mercaptans can be used for this purpose. The amount of the chain transfer agent used is typically not higher than 5% by weight, more preferably not higher than 3% by weight, based on the total weight of the core polymer monomers.

As mentioned previously, polysiloxane rubbers can be employed as the core polymer in the core-shell rubber particles, either alone or in combination with other core polymers. The polysiloxane may, for example, be comprised of di-alkyl or aryl substituted silyloxy units such as dimethyl silyloxy, methylphenyl silyloxy and diphenyl silyloxy. It may be preferable to introduce a crosslinked structure into the polysiloxane by using a multifunctional alkoxy silane compound partially in combination therewith during polymerization or by radically reacting a silane compound having a vinyl reactive group introduced in it or using other methods, if necessary.

In one embodiment, the composition of the polymer used for the shell layer has sufficient affinity for epoxy resin such that the resulting rubber-like core-shell particles can be dispersed stably in the form of primary particles in the epoxy resin.

The polymer comprising the shell layer may be graft-polymerized with and substantially bonded to the polymer constituting the rubber particle core. In certain embodiments, it is desired that preferably not less than 70% by weight, more preferably not less than 80% by weight and still more preferably not less than 90% by weight of the polymer constituting the shell layer is covalently bonded to the polymer comprising the particle core.

The shell layer polymer may contain moieties or units derived from monomers reactive with the epoxy resin or with a curing agent. A functional group of the reactive monomer contained in the shell layer polymer is preferably one capable of chemically reacting with the epoxy resin or the curing agent present in the adhesive compositions of the present invention.

The polymer constituting the shell layer is preferably a polymer or copolymer obtained by copolymerizing at least one component selected from alkyl (meth)acrylates, aromatic vinyl compounds and vinyl cyanide compounds. Particularly when the shell layer is desired to be chemically reactive at the time of curing the adhesive composition, it is preferable from the viewpoint of high reactivity with the epoxy group or the epoxy curing agent that the polymer constituting the shell layer contain at least one monomer selected from the group consisting of (meth)acrylates having a reactive group, such as hydroxyalkyl (meth)acrylates, aminoalkyl (meth)acrylates, epoxyalkyl (meth)acrylates, epoxy alkyl vinyl ethers, unsaturated acid derivatives, (meth)acrylamide derivatives and maleimide derivatives, in addition to the alkyl (meth) acrylate(s), aromatic vinyl compound(s) and/or vinyl cyanide compound(s).

Suitable alkyl (meth)acrylates include, for example, methyl (meth)acrylate, ethyl (meth)acrylate, butyl (meth) acrylate, 2-ethylhexyl (meth)acrylate, and the like. The aromatic vinyl monomers that are suitable include styrene, α-methylstyrene, and the like. Suitable vinyl cyanides include (meth)acrylonitrile and the like.

(Meth)acrylates having reactive groups include, for example, 2-hydroxyethyl (meth)acrylate, 2-aminoethyl (meth)acrylate and glycidyl (meth)acrylate. Suitable epoxy alkyl vinyl ethers include glycidyl vinyl ether. Suitable unsaturated acid derivatives include α,β-unsaturated acids, α,β-unsaturated acid anhydrides, (meth)acrylic acid, itaconic acid and crotonic acid. The (meth)acrylamide derivatives that are suitable include (meth)acrylamide (including N-substituted derivatives thereof). Suitable maleimide derivatives include maleic imide. These can be used alone or in combination thereof.

The ratio (by weight) of the core layer:shell layer in the rubber particles may be in the range of 50:50 to 95:5, e.g., 60:40 to 90:10.

The rubber particles having a core-shell structure can be produced by any method known in the art, such as emulsion polymerization, suspension polymerization, micro-suspension polymerization and the like. In particular, a process involving emulsion polymerization is preferred.

In the embodiment of the invention where the core-shell rubber particles are to be introduced into the adhesive composition in the form of a masterbatch in epoxy resin, the concentration of the rubber particles is not particularly limited. The epoxy resin(s) used to prepare the materbatch may be the same as, or different from, the epoxy resin(s) introduced separately into the composition. In one embodiment, all of the epoxy resin of the adhesive composition of the present invention is introduced in the form of a masterbatch together with the core-shell rubber particles. Assuming that the total amount of the epoxy resin and rubber particles in the masterbatch is 100% by weight, the content of the core-shell particles may be, for example, 0.5 to 80% by weight, e.g., 1 to 70% by weight or 3 to 60% by weight or 20 to 40% by weight.

Particularly suitable dispersions (suspensions) of rubber particles having a core-shell structure and relatively small average particle size in an epoxy resin matrix are available from Kaneka Corporation under the tradenames ACE MX120 and ACE MX156.

Many of the nanosized core-shell rubber structures available from Kaneka in the form of phase separated particles dispersed in epoxy resin are believed to have a core made from a copolymer of (meth)acrylate-butadiene-styrene, where butadiene is the primary component of the copolymer in the core. Other commercially available masterbatches of nanosized core-shell rubber particles dispersed in epoxy resins include GENIOPERL M23A (a dispersion of 30 weight percent core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 weight percent of the core-shell particle), available from Wacker Chemie GmbH.

An amount of nanosized core-shell rubber particles is present in the adhesive composition sufficient to provide the desired increase in yield value as compared to an adhesive composition without such particles. Typically, the adhesive composition may contain from about 0.1 to about 10 weight percent (in one embodiment, from about 0.5 to about 3 weight percent) nanosized rubber particles having a core-shell structure.

Combinations of different nanosized core-shell rubber particles may advantageously be used in the present invention. The core-shell rubber particles may differ, for example, in particle size, the glass transition temperatures of their respective cores and/or shells, the compositions of the polymers used in their respective cores and/or shells, the functionalization of their respective shells, and so forth. A portion of the core-shell particles may be supplied to the adhesive composition in the form of a masterbatch wherein the nanosized particles are stably dispersed in an epoxy resin matrix and another portion may be supplied to the adhesive composition in the form of a dry powder (i.e., without any epoxy resin or other matrix material).

The adhesive composition may also contain one or more core-shell rubbers having an average particle size larger than that of the nanosized core-shell rubber particles previously described (e.g., an average particle size greater than 200 nm, such as about 0.1 to about 0.5 microns). Although such larger particle size core-shell rubbers do not increase the yield value of the epoxy past adhesive as significantly as the nanosized core-shell rubber particles, their presence in the epoxy paste adhesive may be beneficial in improving the impact resistance of the composition when cured (i.e., they may be utilized as auxiliary impact modifiers or toughening agents).

Nanoclay Thixotropic Agent

Thixotropic agents are additives that provide a shear thinning rheology with a delayed recovery in viscosity as the shear is relaxed. The epoxy paste adhesives of the present invention contain at least one particulate nanoclay capable of functioning as a thixotropic agent, wherein the nanoclay particles have at least one dimension that is less than 100 nm, e.g, less than about 50 nm or less than about 10 nm (sometimes referred to hereinafter as a "nanoclay thixotropic agent"). For example, the thixotropic agent may be in the form of platelets having a thickness of less than about 20 nm, less than about 10 nm, or less than about 5 nm and a diameter that is many times larger than the thickness of the platelets. For example, the aspect ratio (the ratio of diameter to thickness) may typically be within the range of from about 50:1 to about 1000:1 or even greater. The surface area of nanoclays generally is relatively high, e.g., at least about 100 $mm^2/g$ or at least about 500 $mm^2/g$. Nanoclays also typically have relatively high surface:volume ratios, thereby distinguishing them from conventional fillers of the type long used in resin and plastic formulations. When initially added to the adhesive composition, the nanoclay platelets or particles may be layered or stacked upon each other and undergo separation or exfoliation when dispersed within the composition. Alternatively, the nanoclay may be rod-like in form, wherein the individual rods are relatively small in diameter (e.g., less than about 20 nm, less than about 10 nm, or less than about 5 nm) with a length that is many times greater than the diameter. For example, the nanoclay rods may have an aspect ratio (length:diameter) within the range of from about 50 to about 1000 or even greater. The presence of a nanoclay thixotropic agent has been found to be critical in order to obtain an adhesive that can be easily pumped (i.e., has a suitably low viscosity under high shear conditions at moderate temperatures, even at temperatures around room temperature) and yet is resistant to being washed off a substrate surface, even at moderately elevated temperatures (e.g., 63 degrees C.).

Organically-modified nanoclays are particularly preferred for use. In one embodiment of the invention, at least one of the nanoclay thixotropic agents utilized in the adhesive composition is an organically modified clay (sometimes referred to as an "organoclay"). In especially preferred embodiments of the invention, the nanoclay thixotropic agent is an organoclay prepared from a mineral clay mixture that has been treated with one or more alkyl quaternary ammonium compounds. For example, the nanoclay may be based on a mixture of clay type A and clay type B, wherein clay type A is sepiolite, palygorskite, or a mixture thereof and clay type B is a smectite clay, with the nanoclays obtained therefrom being often referred to as "mixed mineral thixotropes".

Smectite clays include hectorite, monmorillonite, bentonite, beidelite, saponite, and stevensite.

Clay type A may be the predominate type of clay from which the organoclay is prepared, e.g., clay type A may comprise 50 to 95 weight % of the clay mixture with the balance being smectite. Nanosized organically modified clays prepared from clay mixtures that are especially suitable for use in the present invention are described in U.S. Pat. Nos. 6,036,765; 6,534,570; and 6,635,108, each of which is incorporated herein by reference in its entirety.

In a preferred procedure for preparing the nanoclay thixotropic agent, the sepiolite and/or palygorskite is crushed, ground, slurried in water and screened to remove grit and other impurities. The smectite mineral is subjected to a similar regimen. Each of the component minerals is then subjected, while in the form of a dilute (1 to 6% solids) aqueous slurry, to high shearing in a suitable mill. Most preferred for use in this shearing step is a homogenizing mill of the type wherein high speed fluid shearing of the slurry is effected by passing the slurry at high velocities through a narrow gap, across which a high pressure differential is maintained. This type of action can, e.g., be effected in a Manton-Gaulin ("MG") mill, which is sometimes referred to as a "Gaulin homogenizer". A further description of such a mill can be found in U.S. Pat. Nos. 4,664,842 and 5,110,501, each of which is incorporated herein by reference in its entirety. The conditions under which the MG mill may in the present instance be used can be substantially as in the aforementioned patents; e.g., the said pressure differential across the gap is preferably in the range of from 70,300 to 562,400 g/cm$^2$, with 140,600 to 351,550 g/cm$^2$ being more typical in representative operations. Depending upon the specifics of the equipment, pressures higher than 562,400 g/cm$^2$ can readily be used. The slurry to be treated may be passed one or more times through the MG mill.

The rotor and stator arrangement described U.S. Pat. No. 5,160,454 may also be utilized to effect high shearing of the clay. The use of high shear is not only important in providing the benefits for the smectite which are discussed in the foregoing patents, but moreover in the instances of the sepiolite and/or palygorskite, such high shearing is believed to act to "debundle" the otherwise "bundled" type of structures which exist in the latter minerals. Without wishing to bound by theory, this debundling action is believed to be instrumental in yielding a mixed mineral thixotrope that functions in a particularly effective manner as a nanoclay thixotropic agent in the adhesive compositions of the present invention.

Following the high shear step, the clay component slurries may be mixed with one another. Alternatively, the two or more clay components can be intermixed in a single slurry before the latter is subjected to the high shear step. Following such step the single slurry is intermixed with the alkyl quaternary ammonium salt(s), after which the slurry is dewatered and the alkyl quaternary ammonium-treated clay dried and ground to provide a dry organically modified mixed mineral thixotrope.

Additional methods of preparing organically modified clays are described, for example, in U.S. Pat. Nos. 6,787,592; 5,728,764; 5,663,111; 5,739,087; 5,728,764; 5,663,111; 5,429,999; 5,336,647; 5,160,454; 5,075,033; 4,894,182; 4,742,098; 4,695,402; 4,664,842; 4,569,923; 4,517,112; 4,474,706; 4,474,705; 4,434,076; 4,412,018; 4,382,868; 4,116,866 and 2,966,506, each of which is incorporated herein by reference in its entirety.

Illustrative nanosized organically modified clays available from commercial sources that are useful in the present invention include GARAMITE 1958 (described by the supplier Southern Clay Products as a mixed mineral thixotrope containing about 20 weight percent montmorillonite and 80 weight % smectite).

The amount of nanoclay thixotropic agent present in the adhesive composition is sufficient to effect the desired improvement or increase in yield value (wash-off resistance), which typically is at least about 0.1 weight percent. For example, the adhesive composition may contain from about 0.5 to about 10 weight percent or from about 1 to about 8 weight percent of one or more nanoclay thixotropic agents.

In one desirable embodiment of the invention, the nanoclay thixotropic agent and nanosized core-shell rubber particles are selected and are present in amounts effective to provide a epoxy paste adhesive having a viscosity at 30 degrees C. of less than 100 Pas measured at a shear rate of 20/second and a yield value at 63 degrees C. of at least about 400 Pa.

In addition to at least one nanoclay thixotropic agent, the epoxy paste adhesives of the present invention may contain one or more additional types of thixotropic agents. However, the presence of one or more such auxiliary thixotropic agents is not necessary in order to obtain an adhesive composition having the desired combination of rheological properties (e.g., high wash-off resistance and low viscosity under shear). In one embodiment of the invention, the adhesive contains at least one fumed silica, preferably at least one hydrophobic fumed silica. The use of fumed silica or other auxiliary thixotropic agent(s) in combination with a nanoclay may be desirable under some circumstances for cost reasons. Fumed silica thixotropic agents are well-known in the art and are available from several commercial sources, including the fumed silica products sold under the CAB-O-SIL trademark by Cabot Corporation and the fumed silica products sold under the AEROSIL trademark by Degussa. Hydrophobic fumed silica is fumed silica that has been reacted with a compound (usually an organosilicon compound such as dimethyldichlorosilane, trimethoxyoctylsilane, polydimethylsiloxane or hexamethyldisilazane) to replace at least a portion of the hydroxyl groups on the surface of the fumed silica with other groups such as methyl groups. Specific fumed silicas useful in the present invention include, but are not limited to, CAB-O-SIL TS-720 and AEROSIL US202. In certain embodiments of the invention, the fumed silica has a BET surface area in the range of from about 80 to about 300 m$^2$/g and/or a carbon content of from about 0.5 to about 7 weight percent. Methods of preparing hydrophobic fumed silicas are well-known in the art and include, for example, the methods described in U.S. Pat. Nos. 2,739,075 and 2,786,042 (each of which is incorporated herein by reference in its entirety).

Auxiliary Impact Modifiers/Toughening Agents

The nanosized core-shell rubber particles that comprise a component of the epoxy paste adhesives of the present invention are primarily utilized in order to modify the rheological properties of the adhesive, but also help to improve the toughness or impact properties of the cured adhesive. However, the impact properties of cured epoxy paste adhesives in accordance with the present invention, at room temperature and/or lower temperatures, may often be further improved by incorporating into such compositions one or more auxiliary impact modifiers and/or toughening agents that either a) have a core-shell structure but have an average particle size greater than 200 nm or b) do not have a core-shell structure.

Suitable auxiliary impact modifiers/toughening agents may be selected from a wide variety of substances, but generally speaking such materials are polymeric or oligomeric in character, have glass transition temperatures below 20° C. (more preferably below 0° C. or below −30° C. or below −50° C.), and can contain functional groups such as epoxy groups, carboxylic acid groups, amino groups and/or hydroxyl groups capable of reacting with the other components of the compositions of the present invention when the composition is cured by heating (although alternatively the auxiliary impact modifier/toughening agent may be free of such reactive functional groups).

The epoxy-based prepolymers (sometimes described herein as "adducts") obtained by reacting one or more amine-terminated polymers such as amine-terminated polyethers and amino silane-terminated polymers with one or more epoxy resins represent a particularly preferred class of auxiliary impact modifiers/toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is well known in the art and is described, for example, in U.S. Pat. Nos. 5,084,532 and 6,015,865, each of which is incorporated herein by reference in its entirety. Generally speaking, it will often be desirable to adjust the ratio of amine-terminated polyether:epoxy resin being reacted such that there is an excess of epoxy groups relative to amine groups such that the latter functional groups are completely reacted (i.e., the epoxy-based prepolymer contains essentially no free amine groups).

Mixtures of di- and trifunctional amine-terminated polyethers may be used. Amine-terminated polyethers containing both oxyethylene and oxypropylene repeating units may also be utilized as the amino-terminated polyether. Preferably, the amino-terminated polyether contains at least two amine groups per molecule. Preferably, the amine groups are primary amine groups. The amino-terminated polyether is preferably aliphatic.

When reacting the epoxy resins with the amine-terminated polyether, an excess of epoxy groups over the amino groups is preferably used so that the latter react completely with epoxide groups. Typically, there is a 1.5 to 10-fold excess, for example a 3.5-fold excess of epoxy groups over the active hydrogen equivalents (AHEW) of the amine-terminated polyether. In preparing the composition according to the present invention, the epoxy-based prepolymer component preferably is initially prepared in a first stage. To this end, preferably, the epoxy resins are reacted with the amine-terminated polyether c) in the desired ratio. The reaction preferably is carried out at high temperature, preferably at 90 to 130° C., for example at approximately 120° C., for a duration of, e.g., three hours.

In the preparation of the epoxy-based prepolymer, the following compounds may, for example, be used:

1. linear amine-terminated polyoxyethylene ethers having the formula:

$$H_2N-(CH_2)_2-[O-(CH_2)_2-O-(CH_2)_2]_n-NH_2$$

in which n preferably is 17 to 27.

2. linear amine-terminated polyoxypropylene ethers having the formula:

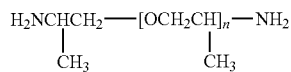

and isomers thereof in which n preferably is 5 to 100. They are obtainable from Huntsman Chemical under the trade name Jeffamine® (D-series). The number average molecular weight of such amine-terminated polyoxypropylene ethers may vary, for example, from about 300 to about 5000.

3. trifunctional compounds having the formula:

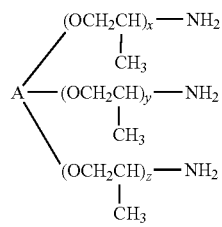

and isomers thereof in which A is

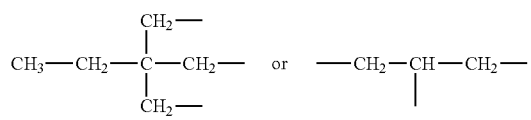

and x, y and z independently of each other are 1 to 40 and x+y+z is preferably >6. Representative examples of these trifunctional compounds are available commercially from Huntsman Chemical under the trade name Jeffamine® (T-series). Such substances typically have number average molecular weights of from about 300 to about 6000.

4. amino silane capped polymers, such as those that may be embraced by the general structure:

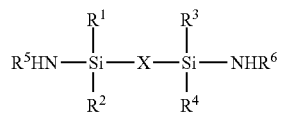

where $R^1$, $R^2$, $R^3$ and $R^4$ may be the same or different and are selected from hydrogen, hydroxyl, alkyl, alkoxy, alkenyl, alkenyloxy, aryl, and aryloxy; $R^5$ and $R^6$ may be the same or different and are selected from hydrogen, alkyl and aryl; and X is selected from alkylene, alkenylene, arylene, with or without interruption by a heteroatom; polyurethanes; polyethers; polyesters; polyacrylates; polyamides; polydienes; polysiloxanes; and polyimides.

For instance, amine-terminated siloxanes may be used, such as diamino siloxanes embraced by:

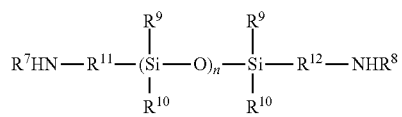

where $R^{11}$ and $R^{12}$ may be the same or different and are selected from alkylene, arylene, alkylene oxide, arylene oxide, alkylene esters, arylene esters, alkylene amides or arylene amides; $R^9$ and $R^{10}$ may be the same or different and are selected from alkyl or aryl; $R^7$ and $R^8$ are as defined above and n is 1-1,200.

Other tougheners or impact modifiers known in the epoxy adhesive art may be used in addition to, or as a substitute for, the aforementioned epoxy-based prepolymers derived by reaction of amine-terminated polyethers or amine-terminated polysiloxanes with epoxy resins. Generally speaking, such tougheners and impact modifiers are characterized by having glass transition temperatures below about 0° C., preferably below about −30° C., even more preferably below about −50°

C. Examples of such tougheners and impact modifiers include, but are not limited to:

reaction products of epoxy-reactive copolymers of butadiene (especially epoxy-reactive copolymers of butadiene with relatively polar comonomers such as (meth)acrylonitrile, (meth)acrylic acid, or alkyl acrylates, e.g., carboxyl-terminated butadiene-nitrile rubbers, such as the products available commercially from Noveon under the trade name HYCAR) with epoxy resins (as described, for example, in U.S. Patent Application Publication No. US 2003/0196753 and U.S. Pat. No. 6,776,869, each of which being incorporated herein by reference in its entirety);

adducts of anhydrides (e.g., unsaturated anhydrides such as maleic anhydride) and diene polymers (e.g., liquid 1,4-cis polybutadienes), typically having number average molecular weights between about 1000 and about 5000, including for example, the adducts sold under the tradename POLYVEST by Degussa Corporation, as well as further reaction products of such adducts with epoxy resins;

polyesters, including, for example, amorphous, crystalline and/or semi-crystalline polyesters, including saturated polyesters, prepared by condensation of aliphatic and/or aromatic dicarboxylic acids (or the corresponding alkyl esters or anhydrides with diols having a chain length of C2 to C20, the polyesters being of medium molecular weight (e.g., about 1000 to about 20,000 number average molecular weight), such as the polyesters sold under the tradename DYNACOLL by Degussa Corporation, and including polyesters functionalized with carboxylic acid and/or hydroxyl endgroups, as well as adducts of such functionalized polyesters with epoxy resins;

adducts of dimeric fatty acids with epoxy resins (including, for example, the adducts sold under the tradename EPON 872 by Resolution Performance Products, the adducts sold under the tradename HyPox DA323 (formerly ERISYS EMDA 3-23) by CVC Specialty Chemicals, as well as those adducts described in U.S. Pat. No. 5,218,063, incorporated herein by reference in its entirety);

adducts of hydroxyl-containing triglycerides (e.g., castor oil) with epoxy resins (including, for example, the adducts sold under the tradename HELOXY 505 by Resolution Performance Products);

adducts of polysulfides with epoxy resins (including, for example, the adducts sold under the tradename THIOPLAST EPS 350 by Akzo Nobel);

adducts of amine-terminated polydienes and diene copolymers with epoxy resins;

block copolymers, wherein at least one polymeric block of the copolymer has a glass transition temperature below 20° C. (preferably below 0° C. or below −30° C. or below −50° C.) and at least one polymeric block of the copolymer has a glass transition temperature above 20° C. (preferably above 50° C. or above 70° C.), in particular block copolymers containing a polystyrene block, a 1,4-polybutadiene block (preferably having a glass transition temperature below about −60 degrees C.) and a polymethylmethacrylate block (preferably, having a highly, i.e., >80%, syndiotactic structure), such as the SBM copolymers made by living polymerization methods using nitroxide initiator (such as the methods described in U.S. Pat. Nos. 5,677,387, 5,686,534, and 5,886,112, each of which is incorporated herein by reference in its entirety) and sold under the tradename NANOSTRENGTH by Arkema and the block copolymers described in U.S. Pat. No. 6,894,113, incorporated herein by reference in its entirety;

polyurethanes, including the reaction products of isocyanate-terminated prepolymers and compounds having one or more active hydrogen-containing groups (e.g., hydroxyl, thiol and amino groups such as primary aliphatic, cycloaliphatic, heteroaromatic and araliphatic amino, secondary aliphatic, cycloaliphatic, heteroaromatic and araliphatic amino, alkyl amido, phenolic, benzyl alcohol, aminophenyl or benzylamino groups or the like, such as those described in U.S. Pat. Nos. 3,525,779; 3,636,133; 5,278,257; and 6,776,869; published U.S. application 2005-070634, and WO 2006/128722, each of which is incorporated herein by reference in its entirety) and the reaction products of isocyanate-terminated prepolymers and hydroxy-containing epoxide compounds (such as those described in Canadian Applications Nos. 2,510,486 and 2,532,215, each of which is incorporated herein by reference in its entirety). Such polyurethanes may or may not contain isocyanate-reactive end groups (e.g., active hydrogen-containing end groups);

carboxyl-functionalized adducts of amino- or hydroxyl-terminated polymers and carboxylic anhydrides, as well as further reaction products of such adducts with epoxy resins (such as those described in U.S. Pat. No. 6,884,854 and published U.S. application 2005-0215730, each of which is incorporated herein by reference in its entirety);

epoxy-terminated polyethers, such as polymers of alkylene oxides like ethylene oxide, propylene oxide or mixtures thereof that have been functionalized with epoxy groups, including by reacting the hydroxy groups of a polyalkylene glycol with epichlorohydrin; and phenol-terminated and aminophenyl-terminated products produced by reacting a stoichiometric excess of a carboxylic anhydride or dianhydride with a diamine or polyamine and then further reacting the excess carboxylic anhydride or carboxylic acid groups with at least one polyphenol or aminophenol, as described, for example, in published U.S. application 2004-0181013, incorporated herein by reference in its entirety.

Mixtures of different auxiliary impact modifiers/toughening agents may be used. The amount of auxiliary impact modifier/toughening agent in the curable compositions of the present invention may vary substantially but typically is from about 0.1 to about 40 weight percent, e.g., from about 5 to about 35 weight percent.

Typically, for example, the adhesive composition may contain from about 5 to about 40 weight percent (in one embodiment, from about 10 to about 35 weight percent) of epoxy-based prepolymer.

Curing Agents

Since the compositions of the present invention are preferably one-part or single-component compositions and are to be cured at elevated temperature after being stored for some period of time in unreacted form at ambient temperatures, they also contain one or more curing agents (hardeners) capable of accomplishing cross-linking or curing of certain of the adhesive components when the adhesive is heated to a temperature well in excess of room temperature. That is, the hardener is activated by heating. The hardener may function in a catalytic manner or, in preferred embodiments of the invention, participate directly in the curing process by reaction with one or more of the adhesive components.

There may be used as thermally-activatable or latent hardeners for the adhesive compositions of the present invention, for example, guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. For single-component, thermosetting adhesives, the selection criterion is, of course, the low solubility of those substances at room temperature in the resin system, so that solid, finely ground hardeners are preferred; dicyandiamide is especially suitable. Good storage stability of the composition is thereby ensured.

In addition to or instead of the above-mentioned hardeners, catalytically-active substituted ureas may be used. They are especially p-chlorophenyl-N,N-dimethylurea (monuron), 3-phenyl-1,1-dimethylurea (fenuron) or 3,4-dichlorophenyl-N,N-dimethylurea (diuron). In principle, catalytically active tertiary acryl- or alkyl-amines, such as benzyldimethylamine, tris(dimethylamino)phenol, piperidine or piperidine derivatives, may also be used, but they are in many cases too highly soluble in the adhesive system, so that usable storage stability of the single-component system is not achieved. Various imidazole derivatives, preferably solid imidazole derivatives, may also be used as catalytically-active accelerators. Examples which may be mentioned are 2-ethyl-2-methylimidazole, N-butylimidazole, benzimidazole and N—$C_1$ to $C_{12}$-alkylimidazoles or N-arylimidazoles. Particular preference is given to the use of a combination of hardener and accelerator in the form of so-called accelerated dicyan-diamides in finely ground form. The separate addition of catalytically-active accelerators to the epoxy hardening system is thus not necessary.

The amount of curing agent utilized will depend upon a number of factors, including whether the curing agent acts as a catalyst or participates directly in crosslinking of the composition, the concentration of epoxy groups and other reactive groups in the composition, the desired curing rate and so forth. Typically, the composition contains from about 0.5 to about 10 weight percent curing agent(s).

Other Additives

The inventive compositions may also contain known fillers such as the various ground or precipitated chalks, quartz powder, alumina, dolomite, clays other than nanoclay thixotropic agents, mica, talc, calcium carbonate, carbon fibers, glass fibers, polymeric fibers, titanium dioxide, fused silica, carbon black, calcium oxide, calcium magnesium carbonates, barite and, especially, silicate-like fillers of the aluminum magnesium calcium silicate type, for example wollastonite and chlorite. Typically, the compositions of the present invention may contain from about 0.5 to about 20 weight percent of fillers.

In one embodiment of the invention, the composition additionally contains one or more expanding agents (sometimes referred to in the art as blowing agents). The expandable properties of the resulting adhesive are particularly useful in applications where the complete filling of a gap or cavity in a part or member is critical in order to maintain maximum structural integrity of the part or member. If the composition is to be utilized as a one-part or single-component composition, the expanding agent is preferably a latent expanding agent that causes expansion or foaming of the adhesive only when heated to a temperature significantly above room temperature (typically, a temperature which is in the range at which curing of the adhesive is also initiated). Any suitable expanding agent may be employed, such as a chemical expanding agent, e.g., azo compounds, nitroso compounds, carbazides, hydrazides and the like, as well as expandable microspheres. Expandable microspheres generally comprise small diameter polymeric shells or bubbles which encapsulate one or more volatile substances such as light hydrocarbons or halocarbons. The outer shells are usually thermoplastic in character to permit softening and expansion of the microspheres when heated due to volatilization of the substances trapped within the shells. The polymers used in the shells may be linear, branched, or cross-linked and may be comprised of, for example, acrylic resins, styrenic resins, polyvinylidene chloride, nitrile polymers, and the like. Typically, the average particle size of the expandable microspheres is in the range of from about 5 to about 100 microns. Suitable expandable microspheres are commercially available under the trademark name DUALITE from Henkel Corporation (formerly, Pierce & Stevens). Typically, up to about 10 weight % (e.g., 0.1 to 2 weight %) blowing agent can be present, although it is not required for the epoxy paste adhesives of the present invention to contain any blowing agent.

In yet another embodiment, hollow glass microspheres are present in the composition. Commercially available hollow glass microspheres include the materials sold by Minnesota Mining & Manufacturing under the trademark SCOTCHLITE, with suitable grades including those available under the designations B38, C15, K20 and VS 5500. The glass microspheres preferably have diameters in the range of from about 5 to 200 micrometers and/or densities of from about 0.3 to about 0.5 g/cc. Typically, the composition may contain up to about 10 weight percent (e.g., from about 0.5 to about 5 weight percent) of hollow glass microspheres; in other embodiments, however, the epoxy paste adhesive of the present invention is free of hollow glass microspheres.

The adhesive compositions according to the present invention may also contain other common adjuvants and additives, such as plasticizers, reactive and/or non-reactive diluents, flow auxiliaries, coupling agents (e.g., silanes), adhesion promoters (e.g., chelating epoxy resins), wetting agents, antistringing agents (e.g., mixtures of amorphous silica and fibrillated polyethylene fibers, such as the product sold under the tradename SYLOTHIX 53 by W. R. Grace), tackifiers, flame retardants, biocides, ageing and/or corrosion inhibitors, stabilizers and/or coloring pigments. Depending on the requirements of the adhesive application with respect to its processing properties, its flexibility, the required rigidifying action and the adhesive bond to the substrate, the relative proportions of the individual components may vary within comparatively wide limits.

In one embodiment, the composition includes a reactive diluent such as a mono-epoxide (e.g., monoglycidyl ethers of alkyl- and alkenyl-substituted phenols or long chain aliphatic alcohols, such as C8 to C20 straight chain saturated aliphatic alcohols). Typically, the composition may contain up to about 25 weight percent (e.g., from about 5 to about 18 weight percent) reactive diluent. In general, one or more reactive diluents may be used in an amount effective to lower the viscosity of the epoxy paste adhesive to the desired level.

Methods of Use

The inventive composition is suitable for adhering together parts made of different materials, including, for example, wood, metal, coated or pretreated metal, plastic, filled plastic, thermoset materials such as sheet molding compound and the like. The substrates to be joined using the adhesive may be the same as or different from each other. The adhesive composition is preferably used for the gluing of metal parts and particularly for the gluing of steel sheets such as cold rolled steel sheets, electro-galvanized steel sheets, hot-dip galvanized steel sheets, galvannealed steel sheets and/or zinc/nickel-coated steel sheets, for example. The composition is especially useful for bonding substrates which, subsequent to the application of the adhesive but prior to heating and curing of the adhesive, will be contacted with liquid in the form of an aqueous bath or stream.

The inventive composition can be applied to a substrate surface by any technique known in the art. For example, it can be applied by extrusion from a robot in bead form onto the substrate or by mechanical application methods such as a caulking gun or extruder, or any other manual application means, and can also be applied using a swirl or streaming technique. The swirl and streaming techniques utilize equipment well known in the art such as pumps, control systems, dosing gun assemblies, remote dosing devices and application guns. Generally, the adhesive is applied to one or both of the substrates to be joined. The substrates are contacted such that the adhesive is located between the substrates to be bonded together. Thereafter, the adhesive composition is subjected to heating to a temperature at which the heat curable or latent curing agent initiates cure of the epoxy paste adhesive.

The epoxy paste adhesive of this invention is preferably formulated to be capable of being flowed or pumped to the work site at ambient temperatures or slightly above ambient temperatures (e.g., from about 15 to about 45 degrees C.) since, in most applications, it is preferable to ensure that the adhesive is heated only up to a temperature at which the latent curing agent is not yet activated. To reduce the viscosity of the adhesive composition to a workable level (i.e., to render it capable of flowing as a liquid) it may be desirable to subject it to high shearing forces using suitable equipment. The composition may be applied directly to the substrate surface or may be allowed to flow into a space separating the substrates to be joined, such as in a hem flanging operation. An advantage of the present invention is that the adhesive need not be subjected to a precuring or gelling step wherein the adhesive, after being applied to the substrate surface, is heated to an intermediate temperature (i.e., above room temperature but below the final cure temperature) for a time effective to cause the adhesive to gel or cure to an extent effective to render the adhesive resistant to wash-off. That is, the epoxy paste adhesive of the present invention inherently has a yield value sufficiently high that a precuring or gelling step is not necessary, thereby simplifying the assembly processes in which such adhesive is used. However, if it is desired to further increase the wash off resistance of the adhesive composition, such a tempering step could be practiced (e.g., the adhesive composition could be heated to a temperature of from about 50 degrees C. to about 100 degrees C. for a time effective to increase the yield value to the desired level).

The epoxy paste adhesive is preferably cured in an oven at a temperature which lies clearly above the temperature at which the composition was applied to the parts to be bonded and at or above the temperature at which the curing agent and/or accelerator and/or latent expanding agent (if present) are activated (i.e., in the case of the hardener, the minimum temperature at which the curing agent becomes reactive towards the other components of the adhesive; in the case of the expanding agent, the minimum temperature at which the expanding agent causes foaming or expansion of the adhesive). Curing preferably takes place at a temperature above 150° C., for example at 160 to 190° C., for about 10 to about 60 minutes.

One particularly preferred application for the adhesives according to the present invention is the formation of structural bonds in vehicle construction such as in hem flanges (e.g., bodyshell construction). The adhesive compositions according to the present invention may also be used as casting resins in the electrical or electronics industry or as die attach adhesives in electronics for bonding components to printed circuit boards. Further possible applications for the compositions are as matrix materials for composites, such as fiber-reinforced composites.

In the embodiment of the invention where the composition includes one or more expanding agents, the adhesive may be utilized to form structural foams which serve to stiffen and reinforce cavities, gaps, structural members and the like. The composition may be supported or contained within a carrier or receptacle or the like so as to position or orient the adhesive such that it expands in one or more particular directions when heated to induce curing and foaming. The composition thus is particularly useful in filling irregularly shaped spaces, as the composition will expand so as to come into contact with a greater portion of the substrate surfaces in the vicinity of the composition than would occur if no expanding agent was present. The foamed, cured composition stiffens and/or increases the energy absorption capacity of vehicle cavities and structural members.

EXAMPLES

A series of adhesive compositions containing the components listed in Table 1 was prepared to demonstrate the effects of varying the amounts of nanoclay thixotropic agent and nanosized core-shell rubber particles present in the composition, as well as the effects of substituting other materials for the nanoclay thixotropic agent and/or nanosized core-shell rubber particles or omitting such components altogether.

TABLE 1

| Component | Ex. 1 | Ex. 2* | Ex. 3 | Ex. 4* | Ex. 5* | 6* |
| --- | --- | --- | --- | --- | --- | --- |
| Liquid Epoxy Resin[1] | 72.30 | 72.30 | 72.30 | 77.30 | 77.30 | 77.30 |
| Reactive Diluent[2] | 3.00 | 3.00 | 3.00 | 3.00 | 3.00 | 3.00 |
| Core-Shell Rubber Particles[3] | 5.00 | 5.00 | 5.00 | — | — | — |
| Nanoclay Thixotropic Agent[4] | 3.00 | — | — | 3.00 | — | — |
| Organically Modified Clay[5] | — | 3.00 | — | — | 3.00 | — |
| Curing Agent A[6] | 6.00 | 6.00 | 6.00 | 6.00 | 6.00 | 6.00 |
| Filler[7] | 1.00 | 1.00 | 1.00 | 1.00 | 1.00 | 1.00 |
| Hydrophobic Fumed Silica[8] | — | — | 3.00 | — | — | 3.00 |
| Colorant[9] | 0.20 | 0.20 | 0.20 | 0.20 | 0.20 | 0.20 |
| Curing Agent B[10] | 0.50 | 0.50 | 0.50 | 0.50 | 0.50 | 0.50 |
| Viscosity at 30° C., 20/s [Pas] | 40 | 17 | 22 | 14 | 14 | 22 |
| Viscosity at 30° C., 60/s [Pas] | 23 | 13 | 13 | 8 | 11 | 13 |
| Yield Value at 30° C. [Pa] | 507 | 128 | 258 | 160 | 122 | 248 |
| Viscosity at 63° C., 20/s [Pas] | 16 | 6 | 17 | 90 | 2.8 | 9 |
| Viscosity at 63° C., 60/s [Pas] | 6 | 3 | 7 | 6 | 1.8 | 4 |
| Yield Value at 63° C. [Pa] | 278 | 94 | 307 | 2 | 53 | 153 |

TABLE 1-continued

| Component | Ex. 7 | Ex. 8 | Ex. 9 | Ex. 10 | Ex. 11* | Ex. 12* | Ex. 13* | Ex. 14* | Ex. 15 | Ex. 16* |
|---|---|---|---|---|---|---|---|---|---|---|
| Liquid Epoxy Resin[1] | 76.30 | 67.30 | 74.30 | 70.30 | 76.30 | 67.30 | 74.30 | 70.30 | 70.30 | 50.30 |
| Reactive Diluent[2] | 3.00 | 3.00 | 3.00 | 3.00 | 3.00 | 3.00 | 3.00 | 3.00 | 3.00 | 3.00 |
| Nanosized Core-Shell RubberParticles[3] | 1.00 | 10.00 | 5.00 | 5.00 | 1.00 | 10.00 | 5.00 | 5.00 | 5.00 | 30.00 |
| Nanoclay Thixotropic Agent[4] | 3.00 | 3.00 | 1.00 | 5.00 | — | — | — | — | 2.50 | — |
| Curing Agent A[6] | 6.00 | 6.00 | 6.00 | 6.00 | 6.00 | 6.00 | 6.00 | 6.00 | 6.00 | 6.00 |
| Filler[7] | 10.00 | 10.00 | 10.00 | 10.00 | 10.00 | 10.00 | 10.00 | 10.00 | 10.00 | 10.00 |
| Hydrophobic Fumed Silica[8] | — | — | — | — | 3.00 | 3.00 | 1.00 | 5.00 | 2.50 | — |
| Colorant[9] | 0.20 | 0.20 | 0.20 | 0.20 | 0.20 | 0.20 | 0.20 | 0.20 | 0.20 | 0.20 |
| Curing Agent B[10] | 0.50 | 0.50 | 0.50 | 0.50 | 0.50 | 0.50 | 0.50 | 0.50 | 0.50 | 0.50 |
| Viscosity at 30° C., 20/s [Pas] | 25.5 | 62.3 | 26.3 | 98 | 53.3 | 66.8 | 29.1 | 91.8 | 46.8 | 15.5 |
| Viscosity at 30° C., 60/s [Pas] | 16 | 34.7 | 17.9 | 56 | 37.9 | 46.1 | 24.7 | 55 | 24.1 | 14.5 |
| Yield Value at 30° C. [Pa] | 258 | 742 | 242 | 1187 | 419 | 554 | 120 | 985 | 639 | 29 |
| Viscosity at 63° C., 20/s [Pas] | 12.5 | 37.7 | 10.7 | 23 | 9.5 | 27.1 | 7 | 28.7 | 31.6 | 1.1 |
| Viscosity at 63° C., 60/s [Pas] | 5.3 | 14.4 | 5.1 | 10 | 5.3 | 11.3 | 3.8 | 12.9 | 11.7 | 0.8 |
| Yield Value at 63° C. [Pa] | 211 | 652 | 158 | 361 | 127 | 462 | 92 | 433 | 547 | 10 |

*comparative example
[1]EPON 828 diglycidyl ether of bisphenol A (185-192 epoxide equivalent weight; Dow)
[2]HELOXY Modifier 8 aliphatic monoglycidyl ether containing alkyl chains that are predominately C12 and C14 (Hexion Specialty Chemicals)
[3]KANEKA ACE MX120 (masterbatch of 25 weight % nano-sized core-shell rubber in a diglycidyl ether of bisphenol A matrix; Kaneka Corp.)
[4]GARAMITE 1958 mixed mineral thixotrope (Southern Clay Products)
[5]BENTONE SD-2 organically modified montmorillonite clay (Elementis Specialties Inc.)
[6]AMICURE CG 1200 dicyandiamide (Air Products)
[7]ULTRAFLEX precipitated calcium carbonate (Pfizer)
[8]AEROSIL US202 (Degussa) or Cabosil TS-720 (Cabot)
[9]MONARCH 280 carbon black (Cabot)
[10]AMICURE UR 1,1-dimethyl-3-phenylurea (Air Products) or DYHARD UR300

Examples 17-29

A series of different epoxy paste adhesives was prepared, with each adhesive containing the following common components:

| | |
|---|---|
| 12.50 wt. % | HELOXY Modifier 107 diglycidyl ether of cyclohexanedimethanol (Hexion Specialty Chemicals) |
| 0.20 wt. % | SILQUEST A-187J gamma-glycidoxypropyltrimethoxysilane (GE Advanced Materials) |
| 21.00 wt. % | adduct of amine-terminated polyether and epoxy resin, prepared in accordance with U.S. Pat. No. 6,015,865 (auxiliary toughener) |
| 0.50 wt. % | BUSAN 11-M1 additive (Buckman Laboratories) |
| 0.50 wt. % | BA-59A flame retardant |
| 1.00 wt. % | calcium oxide |
| 5.00 wt. % | AMICURE CG 1200 dicyandiamide (Air Products) |
| 0.90 wt. % | CELLCOM AC7000F azodicarbonamide (Kum Yong Co., Ltd.) |
| 8.27 wt. % | ULTRAFLEX precipitated calcium carbonate (Pfizer) |
| 2.90 wt. % | CAB-O-SIL TS-720 fumed silica (Cabot) (omitted from Example 29) |
| 0.30 wt. % | SYLOTHIX 53 anti-stringing agent (W. R. Grace) |
| 0.30 wt. % | MONARCH 280 carbon black (Cabot) |
| 0.40 wt. % | AMICURE UR 1,1-dimethyl-3-phenylurea (Air Products) |

In addition, the adhesives contained the components listed in Table 2 (the amounts shown are in weight %, based on the total weight of the adhesive).

TABLE 2

| Component | Ex. 17* | Ex. 18 | Ex. 19* | Ex. 20* | Ex. 21* | Ex. 22* |
|---|---|---|---|---|---|---|
| Epoxy Resin[1] | 43.33 | 38.33 | 38.33 | 38.33 | 38.33 | 38.33 |
| Core-Shell Rubber/Epoxy Resin Blend A[2] | — | 5.00 | — | — | — | — |
| Core-Shell Rubber/Epoxy Resin Blend B[3] | — | — | 5.00 | — | — | — |
| Core-Shell Rubber/Epoxy Resin Blend C[4] | — | — | — | 5.00 | — | — |
| Core-Shell Rubber/Epoxy Blend D[5] | — | — | — | — | 5.00 | — |
| Toughener/Epoxy Blend E[6] | — | — | — | — | — | 5.00 |
| Nanoclay Thixotropic Agent[7] | 2.90 | 2.90 | 2.90 | 2.90 | 2.90 | 2.90 |
| Viscosity at 25° C., 10/s, Pas | 166.5 | 210 | 213.8 | 206 | 192 | 169.6 |
| Viscosity at 25° C., 60/s, Pas | 69.87 | 87.79 | 92.13 | 85.33 | 82.32 | 81.54 |
| Yield Value at 25° C., Pa | 520.4 | 673.3 | 646.5 | 670.8 | 577.1 | 416.9 |
| Viscosity at 63° C., 10/s, Pas | 42.26 | 72.2 | 45.5 | 50 | 46.53 | 31.82 |
| Viscosity at 63° C., 60/s, Pas | 10.83 | 16.55 | 12.41 | 12.7 | 12.13 | 9.095 |
| Yield Value at 63° C., Pa | 267.7 | 506.8 | 267.3 | 302.7 | 287.5 | 181.9 |

| Component | Ex. 23* | Ex. 24* | Ex. 25* | Ex. 26* | Ex. 27* | Ex. 28* | Ex. 29 |
|---|---|---|---|---|---|---|---|
| Epoxy Resin[1] | 38.33 | 42.08 | 42.08 | 42.08 | 42.08 | 38.33 | 38.33 |
| Core-Shell Rubber/Epoxy Resin Blend A[2] | 5.00 | — | — | — | — | 5.00 | 5.00 |
| Core-Shell Rubber B[10] | — | 1.25 | — | — | — | — | — |
| Core-Shell Rubber C[11] | — | — | 1.25 | — | — | — | — |
| Core-Shell Rubber D[12] | — | — | — | 1.25 | — | — | — |
| Toughener E[13] | — | — | — | — | 1.25 | — | — |
| Nanoclay Thixotropic Agent[7] | — | 2.90 | 2.90 | 2.90 | 2.90 | — | 5.80 |
| Clay A[8] | 2.90 | — | — | — | — | — | — |
| Clay B[9] | — | — | — | — | — | 2.90 | — |
| Viscosity at 25° C., 10/s, Pas | 78.76 | 180.7 | 179.5 | 209.9 | 220.3 | 119.7 | 183.9 |
| Viscosity at 25° C., 60/s, Pas | 44.86 | 78.07 | 79.31 | 88.73 | 89.65 | 62.41 | 81.37 |
| Yield Value at 25° C., Pa | 97.79 | 552.2 | 516.5 | 623.7 | 286.8 | 286.6 | 617.2 |
| Viscosity at 63° C., 10/s, Pas | 20.97 | 44.04 | 42.06 | 54.81 | 54.26 | 34.23 | |
| Viscosity at 63° C., 60/s, Pas | 5.779 | 12.04 | 11.41 | 14.63 | 14.1 | 9.328 | |
| Yield Value at 63° C., Pa | 119.5 | 276.3 | 248 | 336.1 | 327.4 | 231.8 | |

*comparative example
[1] DER 331 diglycidyl ether of bisphenol A (Dow)
[2] ACE MX120 (Kaneka Corporation)
[3] 25 wt. % ZEON F351 non-nanosized core-shell rubber particles (Nippon Zeon) in DER 331 epoxy resin
[4] 25 wt. % PARALOID 2691A non-nanosized core-shell rubber particles (Rohm & Haas) in DER 331 epoxy resin (Dow)
[5] 25 wt. % BLENDEX 338 non-nanosized core-shell rubber particles (General Electric Advanced Materials) in DER 331 epoxy resin
[6] 25 wt. % NANOSTRENGTH E20 polystyrene-polybutadiene-polymethylmethacrylate triblock copolymer (Arkema) in DER 331 epoxy resin
[7] GARAMITE 1958 mixed mineral thixotrope (Southern Clay Products)
[8] THERMOGLACE H hydrous kaolin (aluminum silicate) clay (Burgess Pigment Co.)
[9] BENTONE SD-2 organically modified montmorillonite clay (Elementis Specialties)
[10] ZEON F351 non-nanosized core-shell rubber particles (Nippon Zeon)
[11] PARALOID 2691A non-nanosized core-shell rubber particles (Rohm & Haas)
[12] BLENDEX 338 non-nanosized core-shell rubber particles (General Electric Advanced Materials)
[13] NANOSTRENGTH E20 polystyrene-polybutadiene-polymethylmethacrylate triblock copolymer (Arkema)

The formulation of Example 18, which is in accordance with the present invention, exhibited a yield value at elevated temperatures (63° C.) that was significantly and surprisingly higher than that of any of the other formulations tested. At the same time, however, the viscosity of the Example 18 formulation under high shear both at 25° C. and 63° C. remained relatively low, which was also surprising. It is believed that this very desirable and unexpected result is due to the use of nanosized core-shell rubber particles in combination with a nanoclay thixotropic agent. Substituting a core-shell rubber having significantly larger particle size for the nanosized core-shell rubber particles resulted in lower yield values at 63° C. not greatly different from what was observed for a formulation that did not contain any type of core-shell rubber particles (compare Examples 19-22 with Example 17). Additionally, the use of a clay other than a nanoclay thixotropic agent led to an adhesive composition having a significantly lower yield value at 63° C. (compare Examples 23 and 28 with Example 18).

In another series of tests, an adhesive composition containing epoxy resin, an adduct of an epoxy resin and an amine-terminated polyether, nanosized core-shell rubber particles, and a nanoclay thixotropic agent based on a mixed mineral thixotrope (GARAMITE 1958) was compared with an analogous adhesive composition in which a carboxyl-terminated butadiene-nitrile rubber (available commercially from Noveon under the trade name HYCAR) was substituted for the nanosized core-shell rubber particles. Neither composition contained any fumed silica. The former composition (containing nanosized core-shell rubber particles) exhibited swelling or gelling (especially at elevated temperatures, e.g., 80 degrees C.) and exhibited a high yield point and good wash off resistance, even though no fumed silica was present. Tempering the composition at an elevated temperature significantly improved the performance of the adhesive. However, the latter composition (which did not contain nanosized core-shell rubber particles) did not exhibit any swelling or gelling at either room temperature or an elevated temperature.

What is claimed is:

1. A pumpable and wash-off resistant epoxy paste adhesive comprising:
    at least one epoxy resin selected from the group consisting of diglycidyl ethers of bisphenol A and bisphenol F and present in an amount of from about 30 wt % to about 65 wt % based on the overall epoxy paste adhesive;
    a dispersion of rubber particles having a core-shell structure in an epoxy resin matrix, said rubber particles having an average particle size of from about 25 to about 150 nm and present in an amount of from about 0.1 wt % to about 10 wt % based on the overall epoxy paste adhesive;
    a thixotropic agent of an organically-modified nanoclay prepared from a mineral clay mixture of different clay types that has been treated with one or more alkyl quaternary ammonium compounds and present in an amount of from about 0.5 wt % to about 10 wt % based on the overall epoxy paste adhesive; and
    at least one heat-activated latent curing agent present in an amount of from about 0.5 wt % to about 10 wt % based on the overall epoxy paste adhesive.

2. The epoxy paste adhesive of claim 1 further comprising at least one impact modifier/toughening agent other than said rubber particles, present in an amount of from about 0.1 wt % to about 40 wt % based on the overall epoxy paste adhesive.

3. The epoxy paste adhesive of claim 1 wherein the at least one heat-activated latent curing agent comprises at least one substituted guanidine.

4. The epoxy paste adhesive of claim 1 further comprising at least one mono-epoxide reactive diluent.

5. The epoxy paste adhesive of claim 1 wherein the at least one epoxy resin is present in an amount of from about 35 wt % to about 60 wt % based on the overall epoxy paste adhesive.

6. The epoxy paste adhesive of claim 1 having: a viscosity at 30 degrees C. of less than 100 Pas measured at a shear rate of 20/second; and a yield value at 63 degrees C. of at least about 400 Pa.

7. The epoxy paste adhesive of claim 1 wherein said rubber particles comprise an elastomeric core of a polymeric material having a glass transition temperature of less than about 0° C. surrounded by a non-elastomeric shell of a polymeric material.

8. The epoxy paste adhesive of claim 7 wherein said elastomeric core comprises a diene homopolymer, a diene copolymer or a polysiloxane elastomer.

9. The epoxy paste adhesive of claim 7 wherein said non-elastomeric shell comprises an alkyl (meth)acrylate homopolymer or copolymer.

10. A method of making a composite article comprising: applying the epoxy paste adhesive of claim 1 to a surface of a substrate; and curing the epoxy paste adhesive.

11. The method of claim 10 wherein the surface of the substrate comprises metal.

12. The method of claim 10 further comprising joining said substrate and a second substrate by contacting the applied epoxy paste adhesive with a surface of said second substrate prior to curing.

13. The method of claim 10 wherein the epoxy paste adhesive is contacted with an aqueous liquid after being applied to said surface and prior to curing.

* * * * *